United States Patent
Huang (10) Patent No.: US 8,742,745 B2
(45) Date of Patent: Jun. 3, 2014

(54) DC-DC CONVERTER AND VOLTAGE CONVERSION METHOD THEREOF

(75) Inventor: Hua-Chiang Huang, Taoyuan County (TW)

(73) Assignee: uPI Semiconductor Corp., Hsinchu County (TW)

( * ) Notice: Subject to any disclaimer, the term of this patent is extended or adjusted under 35 U.S.C. 154(b) by 139 days.

(21) Appl. No.: 13/541,667

(22) Filed: Jul. 4, 2012

(65) Prior Publication Data

US 2013/0027012 A1    Jan. 31, 2013

(30) Foreign Application Priority Data

Jul. 27, 2011   (TW) ............................ 100126620 A (51) Int. Cl.
    *G05F 1/40*  (2006.01)
(52) U.S. Cl.
    USPC .......................................... 323/285; 323/286
(58) Field of Classification Search
    USPC ......... 323/222, 224, 226, 270–274, 282–290; 363/42, 95–98, 131
    See application file for complete search history.

(56) References Cited

U.S. PATENT DOCUMENTS

| | | | | |
|---|---|---|---|---|
| 4,820,891 | A * | 4/1989 | Tanaka et al. | 219/626 |
| 6,215,288 | B1 * | 4/2001 | Ramsey et al. | 323/224 |
| 6,366,070 | B1 * | 4/2002 | Cooke et al. | 323/284 |
| 7,106,130 | B2 * | 9/2006 | Gan et al. | 330/10 |
| 7,652,461 | B2 | 1/2010 | Tateishi | |
| 7,821,236 | B2 * | 10/2010 | Hasegawa et al. | 323/222 |
| 2006/0119340 | A1 | 6/2006 | Tateishi | |

FOREIGN PATENT DOCUMENTS

TW    I307808    3/2009
TW    M357153    5/2009

* cited by examiner

*Primary Examiner* — Rajnikant Patel
(74) *Attorney, Agent, or Firm* — Jianq Chyun IP Office (57) ABSTRACT

A DC-DC converter is provided. When a load of the DC-DC converter is too light, the DC-DC converter can raise a frequency of its PWM signal, and reduce a pulse width of the PWM signal, so as to avoid the frequency of the PWM signal falling into a frequency range that can heard by human's ear and maintain high conversion efficiency of the DC-DC converter.

13 Claims, 7 Drawing Sheets

DC-DC CONVERTER AND VOLTAGE CONVERSION METHOD THEREOF

CROSS-REFERENCE TO RELATED APPLICATION

This application claims the priority benefit of Taiwan application serial no. 100126620, filed on Jul. 27, 2011. The entirety of the above-mentioned patent application is hereby incorporated by reference herein and made a part of this specification.

BACKGROUND OF THE INVENTION

1. Field of the Invention

The invention relates to a direct current (DC)-DC converter. Particularly, the invention relates to a DC-DC converter capable of adjusting a pulse width of a pulse width modulation (PWM) signal, and a voltage conversion method thereof.

2. Description of Related Art

It is known to all that operating voltages of a central processing unit (CPU), a dynamic random access memory (DRAM), a graphic chip, a chip set in a computer system are different, so that a plurality of direct current (DC)-DC converters are used to convert a DC input voltage (for example, 19V) provided by a power supplier into the operating voltages required by various components. A constant on time (COT) regulator is a DC-DC converter. Generally, when a feedback voltage is smaller than a reference voltage, the COT regulator can turn on a main switch in a fixed period, and can adjust a non-conducting period of the main switch to provide a regulated voltage.

When a load variation of the COT regulator is dramatic, an operating frequency of a pulse width modulation (PWM) signal of the COT regulator is correspondingly varied. For example, when the load of the COT regulator becomes lighter, the frequency of the PWM signal is degreased, and a distance between pulses is increased. When the load of the COT regulator becomes very light, the frequency of the PWM signal is lower than 25 KHz, by now the frequency falls into a frequency range that can be received by human's ear. Therefore, when the user uses an electronic product applying the COT regulator (for example, a mobile phone, a computer or a walkman, etc.), noise interference is occurred, which may decrease utilization quality of the electronic product.

SUMMARY OF THE INVENTION

The invention is directed to a direct current (DC)-DC converter and a voltage conversion method thereof, which maintains an operating frequency of a pulse width modulation (PWM) signal to be higher than a frequency range that can be received by human's ear in case that a voltage conversion efficiency is not influenced.

The invention provides a direct current (DC)-DC converter including an adjustment module, an output module and a control module. The adjustment module outputs a second pulse width modulation (PWM) signal having a constant on time (COT) according to a first PWM signal and an output voltage of the DC-DC converter. The output module is coupled to the adjustment module, a ground and an input voltage of the DC-DC converter, and switches the ground and the input voltage in response to the second PWM signal, so as to convert the input voltage into the output voltage. The control module is coupled to the adjustment module and the output module for detecting a frequency of the second PWM signal, where when the frequency of the second PWM signal is lower than a predetermined frequency, the control module controls the output module to pull down the output voltage until a rising edge of the second PWM signal is appeared, and controls the adjustment module to reduce a pulse width of the second PWM signal.

In an embodiment of the invention, the output module includes an inductor, a switching unit and a driving unit. A first end of the inductor outputs the output voltage. The switching unit is coupled to a second end of the inductor, the input voltage and the ground. The driving unit is coupled to the adjustment module, the control module and the switching unit, and controls the switching unit to output the output voltage through the first end of the inductor.

In an embodiment of the invention, the switching unit includes a first transistor and a second transistor. The first transistor and the second transistor are connected in series between the input voltage and the ground, gates of the first transistor and the second transistor are coupled to the driving unit, a common node of the first transistor and the second transistor is coupled to the second end of the inductor, and conducting states of the first transistor and the second transistor are controlled by the driving unit. The driving unit forcibly turns on the second transistor according to a priority mechanism and a control signal until a next first PWM signal is generated earlier. When the frequency of the second PWM signal is lower than the predetermined frequency, the driving unit turns on the second transistor.

In an embodiment of the invention, the DC-DC converter further includes a current detecting unit, which is coupled to the driving unit for detecting a current of the inductor, where when the current of the inductor drops to zero, the driving unit turns off the second transistor, and when the frequency of the second PWM signal is lower than the predetermined frequency, and the current of the inductor drops to zero, the driving unit forcibly turns on the second transistor according to the priority mechanism.

In an embodiment of the invention, the control module includes a frequency detecting unit and a reduction control unit. The frequency detecting unit detects a transition time point of a rising edge of the first PWM signal or the second PWM signal in each signal period, and when the rising edge of the first PWM signal or the second PWM signal is delayed, the frequency detecting unit outputs the control signal to control the driving unit to turn on the second transistor, so as to trigger the next first PWM signal to be generated earlier. The reduction control unit is coupled to the frequency detecting unit and the adjustment module, and controls the adjustment module to reduce the pulse width of the second PWM signal.

In an embodiment of the invention, the adjustment module includes a first comparator, a first current source, a first capacitor, a D-type flip-flop, a third transistor and an inverter. A negative input terminal of the first comparator is coupled to the output voltage. The first current source is coupled to a positive input terminal of the first comparator, and a current generated by the first current source is proportional to the input voltage. The first capacitor is coupled between the positive input terminal of the first comparator and the ground. A data input terminal of the D-type flip-flop is coupled to a first operating voltage, a clock input terminal of the D-type flip-flop is coupled to the first PWM signal, a reset terminal of the D-type flip-flop is coupled to an output terminal of the first comparator, and a data output terminal of the D-type flip-flop is coupled to the driving unit. A drain and a source of the third transistor are respectively coupled to the positive input terminal of the first comparator and the ground. The inverter is coupled between the data output terminal of the D-type flip-flop and a gate of the third transistor.

In an embodiment of the invention, the reduction control unit includes an adjustable current source coupled to the positive input terminal of the first comparator, and when the rising edge of the second PWM signal is delayed, the adjustable current source charges the first capacitor according to a transition delay time of the rising edge of the second PWM signal.

In an embodiment of the invention, the reduction control unit includes a computing unit and an adjustable voltage source. The computing unit is coupled between the output voltage and the negative input terminal of the first comparator. The adjustable voltage source is coupled between the computing unit and the ground. When the rising edge of the second PWM signal is delayed, the adjustable voltage source outputs an adjusting voltage according to the transition delay time of the rising edge of the second PWM signal, and the computing unit pulls down the output voltage by subtracting the adjusting voltage from the output voltage.

In an embodiment of the invention, the reduction control unit is a digital control circuit.

In an embodiment of the invention, the DC-DC converter further includes a feedback unit and a PWM signal generating module. The feedback unit is coupled between an output terminal of the DC-DC converter and the ground. The PWM signal generating module is coupled to the adjustment module and the feedback unit, and generates the first PWM signal according to a reference voltage and a divided voltage of the output voltage.

In an embodiment of the invention, the PWM signal generating module includes an error amplifier, a compensation unit, a ramp generator and a second comparator. A positive input terminal and a negative input terminal of the error amplifier are respectively coupled to the reference voltage and a resistance unit, and the error amplifier generates an error signal according to the reference voltage and the divided voltage of the output voltage. The compensation unit is coupled to an output terminal of the error amplifier, and is used for compensating the error signal. The ramp generator is used for generating a ramp signal. A positive input terminal and a negative input terminal of the second comparator are respectively coupled to the output terminal of the error amplifier and the ramp generator, and the second comparator generates the first PWM signal according to a comparison result of the error signal and the ramp signal.

The invention provides a voltage conversion method, which is adapted to a DC-DC converter, and the voltage conversion method includes following steps. A second PWM signal is output according to a first PWM signal and an output voltage of the DC-DC converter. The output voltage is provided in response to the second PWM signal. It is detected whether a frequency of the first PWM signal or the second PWM signal is lower than a predetermined frequency, where when the frequency of the first PWM signal or the second PWM signal is lower than the predetermined frequency, the output voltage is pulled down, so as to generate the first PWM signal earlier, and reduce a pulse width of the second PWM signal.

According to the above descriptions, the adjustment module is controlled to reduce the pulse width of the second PWM signal according to the frequency of the second PWM signal, which can maintain an operating frequency of the PWM signal to be higher than a frequency range that can be received by human's ear in case that a voltage conversion efficiency is not influenced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
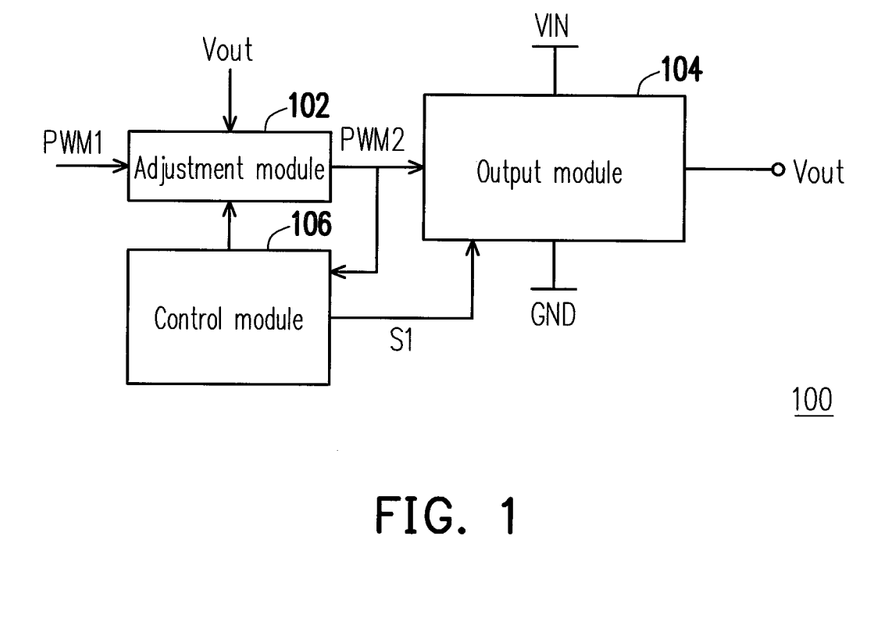
FIG. 1 is a schematic diagram of a direct current (DC)-DC converter according to an embodiment of the invention.

FIG. 1 is a schematic diagram of a direct current (DC)-DC converter according to an embodiment of the invention. Referring to FIG. 1, the DC-DC converter 100 includes an adjustment module 102, an output module 104 and a control module 106. The adjustment module 102 is coupled to the output module 104 and the control module 106, and the control module 106 is coupled to the output module 104. The output module 104 is coupled to a ground GND, an input voltage VIN of the DC-DC converter 100 and the control module 106.

Figure 2:
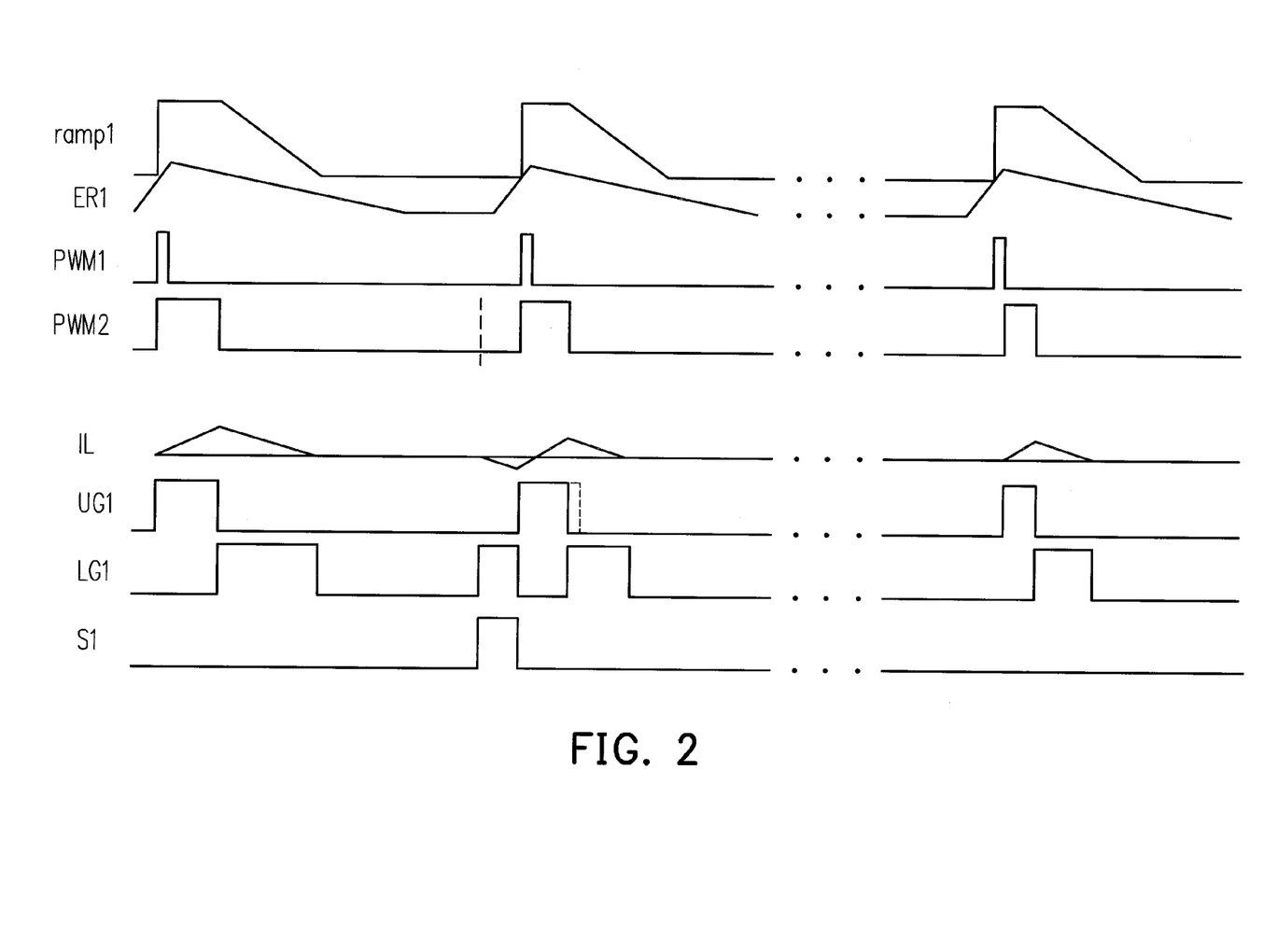
FIG. 2 is a waveform schematic diagram of a plurality of signals of a DC-DC converter according to an embodiment of the invention.

The adjustment module 102 receives a first pulse width modulation (PWM) signal PWM1 and an output voltage Vout of the DC-DC converter 100, and outputs a second PWM signal PWM2 having a constant on time (COT) according to the first PWM signal PWM1 and the output voltage Vout. FIG. 2 is a waveform schematic diagram of a plurality of signals of the DC-DC converter, as shown in FIG. 2, each time when a rising edge of the first PWM signal PWM1 received by the adjustment module 102 is appeared, the adjustment module 102 outputs the second PWM signal PWM2 having a predetermined pulse width. In this way, the output module 104 switches the ground GND and the input voltage VIN in response to the second PWM signal PWM2, so as to convert the input voltage VIN into the output voltage Vout.

Moreover, the control module 106 is used to detect a frequency of the second PWM signal PWM2. In case of a normal load, the frequency of the second PWM signal PWM2 is relatively high, i.e. a time between each two pulses thereof is shorter. When the load of the DC-DC converter 100 is a light load, the frequency of the second PWM signal PWM2 is decreased, i.e. the time between each two pulses is probably longer (for example, 100 us), which may fall into a frequency range that can be heard by human's ear.

When the frequency of the second PWM signal PWM2 is lower than a predetermined frequency, i.e. the time between each two pulses exceeds a predetermined value (for example, 40 μs), the control module 106 outputs a control signal S1 to control the output module 104 to pull down the output voltage Vout, so as to generate a next first PWM signal PWM1 earlier and reduce a distance between pulses of the second PWM signal PWM2 to increase the frequency of the second PWM signal PWM2. Moreover, the control module 106 controls the adjustment module 102 to reduce the pulse width of the second PWM signal PWM2 according to the frequency of the second PWM signal PWM2. In this way, the voltage conversion efficiency of the DC-DC converter 100 is still maintained as the frequency of the second PWM signal PWM2 is increased, so as to resolve the problem of the conventional technique that the operating frequency of the DC-DC converter is excessively low and enters the frequency range that can be heard by human's ear.

When the second PWM signal PWM2 is generated, the control module 106 again detects the frequency of the second PWM signal PWM2 to determine whether it is lower than the predetermined frequency, and if yes, the aforementioned operations are continually executed, and until the control module 106 detects that the frequency of the second PWM signal PWM2 is higher than the predetermined frequency, it stops adjusting the frequency of the second PWM signal PWM2, and maintains the pulse width of the second PWM signal PWM2.

Figure 3:
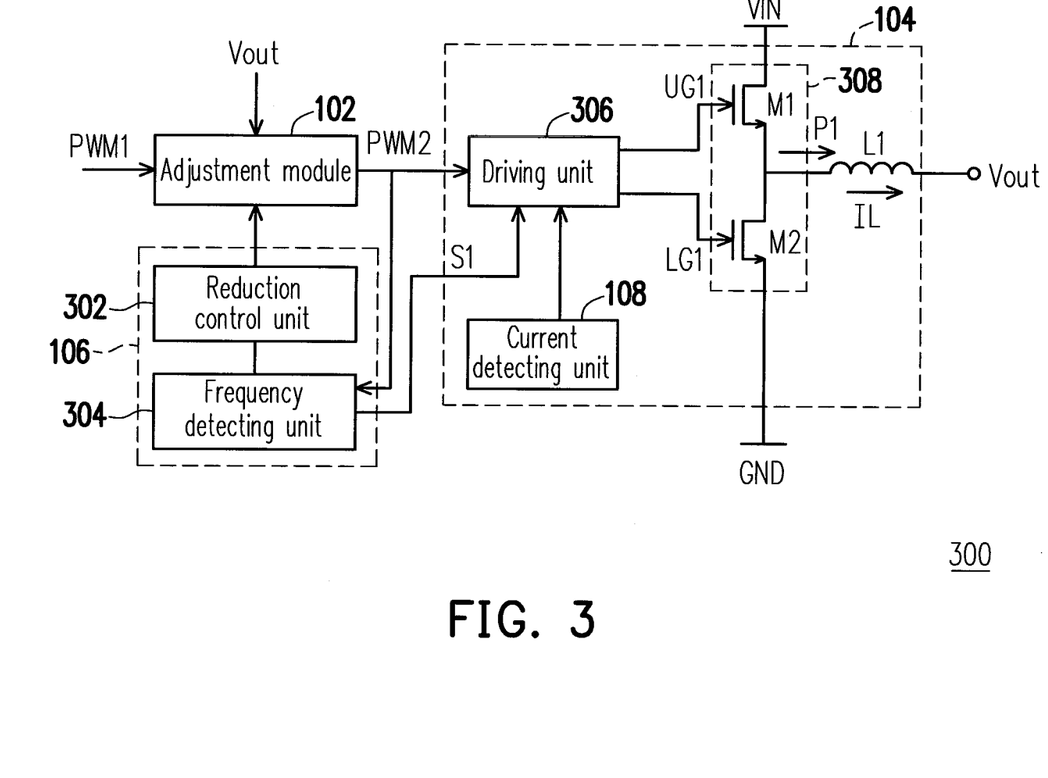
FIG. 3 is a schematic diagram of a DC-DC converter according to another embodiment of the invention.

FIG. 3 is a schematic diagram of a DC-DC converter according to another embodiment of the invention. Referring to FIG. 3, the control module 106 of FIG. 1 includes a reduction control unit 302 and a frequency detecting unit 304. The reduction control unit 302 is coupled to the adjustment module 102 and the frequency detecting unit 304. Moreover, the output module 104 includes a driving unit 306, a switching unit 308, an inductor L1 and a current detecting unit 108. The driving unit 306 is coupled to the adjustment module 102, the frequency detecting unit 304 and the switching unit 308. A first end of the inductor L1 is coupled to an output terminal of the DC-DC converter 100, and a second end thereof is coupled to the switching unit 308. The switching unit 308 is coupled to the input voltage VIN of the DC-DC converter 100 and the ground GND. The current detecting unit 108 is coupled to the driving unit 306.

The current detecting unit 108 is used for detecting a load current, for example, a current IL of the inductor L1. The driving unit 306 outputs switching signals UG1 and LG1 according to the second PWM signal PWM2 and the load current detected by the current detecting unit 108, so as to control the switching unit 308 to switch the input voltage VIN and the ground GND to output the output voltage Vout from the first end of the inductor L1.

In the present embodiment, the switching unit 308 includes a first transistor M1 and a second transistor M2. The first transistor M1 and the second transistor M2 are connected in series between the input voltage VIN of the DC-DC converter 100 and the ground GND, and a common node of the first transistor M1 and the second transistor M2 is coupled to the second end of the inductor L1. Gates of the first transistor M1 and the second transistor M2 are coupled to the driving unit 306 for respectively receiving the switching signals UG1 and LG1.

When the second transistor M2 is in a turn-on state, the first transistor M1 is in a turn-off state, and when the first transistor M1 is in the turn-on state, the second transistor M2 is in the turn-off state. Moreover, when the current IL of the inductor L1 drops to zero, the driving unit 306 turns off the second transistor M2.

In the present embodiment, the frequency detecting unit 304 detects a transition time point of a rising edge of the second PWM signal PWM2 in each signal period. In other embodiments, frequency detecting unit 304 can also detect a transition time point of a rising edge of the first PWM signal PWM1 in each signal period.

As shown in FIG. 2, when the rising edge of the second PWM signal PWM2 (or the first PWM signal PWM1) is delayed, the frequency detecting unit 304 controls the adjustment module 102 to make the driving unit 306 to output the switching signal LG1 to the second transistor M2 to turn on the second transistor M2, so as to trigger a next first PWM signal PWM1 to be generated earlier.

Delay of the rising edge of the second PWM signal PWM2 refers to that after the frequency detecting unit 304 detects appearance of a first second PWM signal PWM2, it determines whether a next second PWM signal PWM2 appears within a predetermined value (for example, 40 μs), and if the second PWM signal PWM2 appears after the predetermined value, it represents that the rising edge of the second PWM signal PWM2 is delayed.

As shown in FIG. 2, in other words, according to a predetermined frequency (for example, 25 KHZ), the second PWM signal PWM2 should be transited to a high voltage logic level at a time point shown by a dot line on the waveform of the second PWM signal PWM2, however, since the load at the output terminal of the DC-DC converter 300 becomes lighter, the frequency of the second PWM signal PWM2 is decreased, a distance between two pulses thereof is broadened, and a time point that the second PWM signal PWM2 is transited to the high voltage logic level is delayed. Now, the frequency detecting unit 304 outputs the control signal S1 of the high voltage logic level to the driving unit 306, and the driving unit 306 provides the switching signal LG1 of the high voltage logic level to the switching unit 308 to turn on the second transistor M2, so as to trigger the next first PWM signal PWM1 to be generated earlier, where the control signal S1 has the high voltage logic level.

It should be noticed that in the present embodiment, when the rising edge of the second PWM signal PWM2 is delayed, although the current IL of the inductor L1 drops to zero, the event of rising edge delay has a higher priority, and the driving unit 306 forcibly turns on the second transistor M2 according to a priority mechanism and the control signal S1 until the next first PWM signal is generated earlier. A mechanism for generating the first PWM signal PWM1 earlier is described later.

As shown in FIG. 2, a second pulse of the second PWM signal PWM2 has a narrower pulse width compared to that of a first pulse. When the second PWM signal PWM2 is transited to the high voltage logic level, the switching signal LG1 is transited to a low voltage logic level, and the switching signal UG1 is transited to the high voltage logic level. Until the second PWM signal PWM2 is transited to the low voltage logic level, the switching signal LG1 is transited to the high voltage logic level, and the switching signal UG1 is transited to the low voltage logic level. A pulse width of the switching signal UG1 is also narrowed due to an influence of the reduction of the pulse width of the second PWM signal PWM2. Moreover, when the current detecting unit 108 detects that the current IL of the inductor L1 drops to zero, the driving unit 306 transits the switching signal LG1 to the low voltage logic level.

It should be noticed that after the pulse width of the second PWM signal PWM2 is reduced, when the second PWM signal PWM2 is transited to the high voltage logic level for a next time as the rising edge of the first PWM signal PWM1 is appeared, if the frequency of the second PWM signal PWM2 is higher than the predetermined frequency, the pulse width of the second PWM signal PWM2 is maintained the same to that of the former second PWM signal PWM2 with the reduced pulse width. If the frequency of the second PWM signal PWM2 is still lower than or equal to the predetermined frequency, the pulse width of the second PWM signal PWM2 is again reduced according to the method as that described above. By repeatedly increasing the frequency of the second PWM signal PWM2 and reducing the pulse width of the second PWM signal PWM2, the frequency of the second PWM signal PWM2 can be adjusted to be greater than the predetermined frequency without influencing the voltage conversion efficiency of the DC-DC converter 300.

Figure 4:
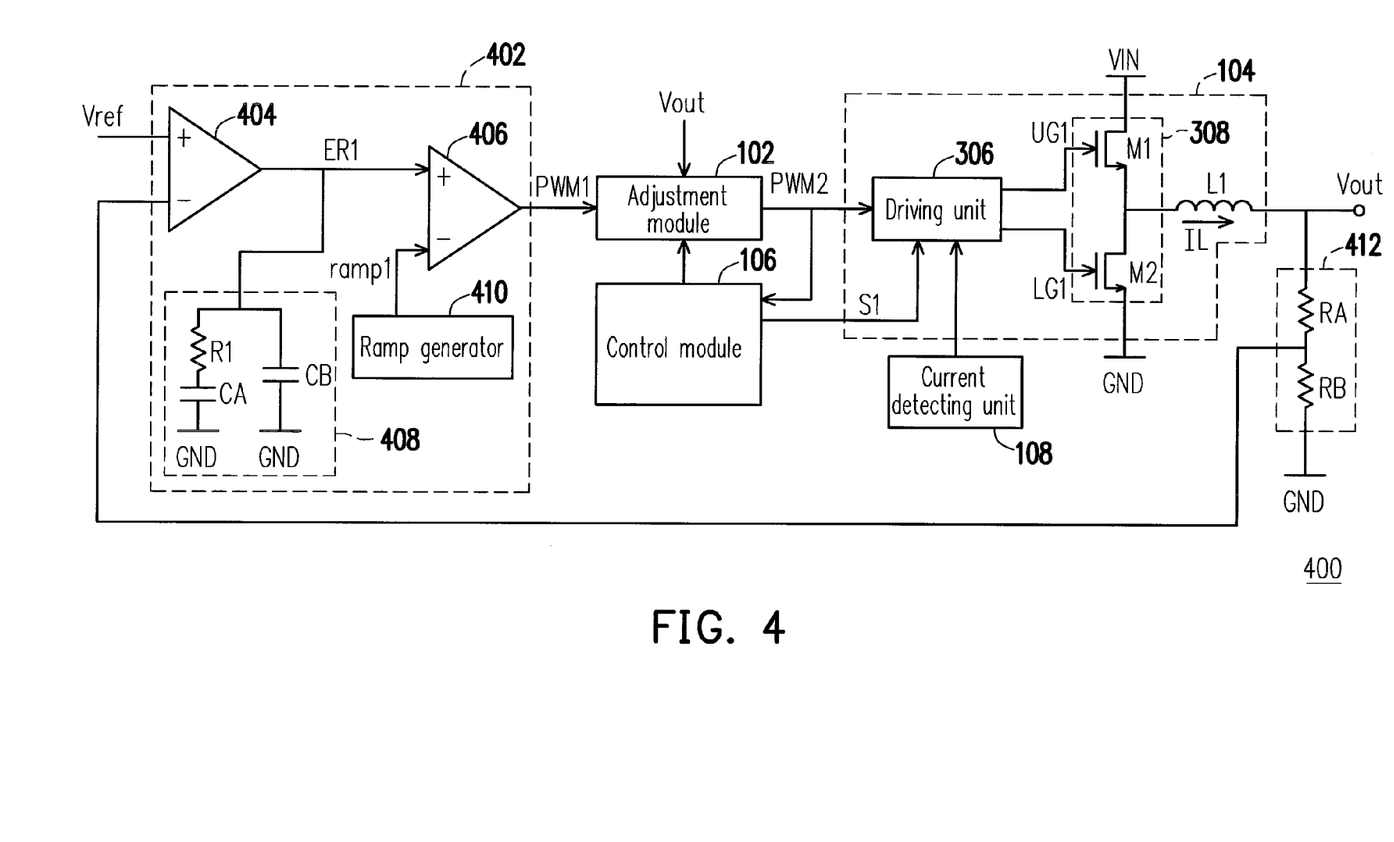
FIG. 4 is a schematic diagram of a DC-DC converter according to another embodiment of the invention.

The first PWM signal PWM1 can be generated through a PWM signal generating module. FIG. 4 is a schematic diagram of a DC-DC converter according to another embodiment of the invention. Referring to FIG. 4, a difference between the DC-DC converter 400 of the present embodiment and the DC-DC converter 100 of FIG. 1 is that the DC-DC converter 400 further includes a PWM signal generating module 402 and a feedback unit 412. The feedback unit 412 is coupled to the adjustment module 102 and the PWM signal generating module 402. The PWM signal generating module 402 generates the first PWM signal PWM1 according to a reference voltage Vref and the output voltage Vout. The voltages respectively received by adjustment module 102 and the PWM signal generating module 402 are proportional to the output voltage Vout. For example, in the present embodiment, the adjustment module 102 directly receives the output voltage Vout, and the PWM signal generating module 402 receives the output voltage Vout that is voltage-divided by the feedback unit 412.

In detail, the PWM signal generating module 402 includes an error amplifier 404, a compensation unit 408, a ramp generator 410 and a second comparator 406. A positive input terminal and a negative input terminal of the error amplifier 404 are respectively coupled to the reference voltage Vref and the feedback unit 412, and the error amplifier 404 generates an error signal ER1 according to the reference voltage Vref and the output voltage Vout. In the present embodiment, the feedback unit 412 includes two resistors RA and RB connected in series between the output terminal of the DC-DC converter 400 and the ground GND, and the error amplifier 404 generates the error signal ER1 according to the reference voltage Vref and a divided voltage of the output voltage Vout.

The compensation unit 408 is coupled to an output terminal of the error amplifier 404, and in the compensation unit 408 of the present embodiment, a resistor R1 and a capacitor CA are connected in series and are further connected in parallel with a capacitor CB, though the invention is not limited thereto. A positive input terminal and a negative input terminal of the second comparator 406 are respectively coupled to the output terminal of the error amplifier 404 and the ramp generator 410. The compensation unit 408 is used for compensating the error signal ER1, and after the error signal ER1 is compensated, the second comparator 406 compares the error signal ER1 with a ramp signal ramp1 provided by the ramp generator 410 to generate the first PWM signal PWM1. Waveforms of the error signal ER1, the ramp signal ramp1 and the first PWM signal PWM1 are as that shown in FIG. 2.

After the second transistor M2 is turned on, the output voltage Vout is pulled down. In case of a normal operation, i.e. the frequency of the first PWM signal PWM1 (or the second PWM signal PWM2) is greater than the predetermined frequency, the output voltage Vout is slowly pulled down due to that the current IL of the inductor L1 is greater than zero, and makes the PWM signal generating module 402 to generate the first PWM signal PWM1 after a certain time period.

However, when the rising edge of the second PWM signal PWM2 is delayed, the current IL of the inductor L1 is zero now, and the output voltage Vout is quickly pulled down to make the error amplifier 404 to generate the error signal ER1, so that the PWM signal generating module 402 generates the first PWM signal PWM1 earlier, so as to provide the second PWM signal PWM2.

After the error amplifier 404 generates the error signal ER1, the output of the error amplifier 404 charges the capacitors CA and CB to gradually pull high a voltage level of the error signal ER1. When the voltage level of the error signal ER1 is pulled up to be higher than the ram signal ramp1, the second comparator 406 outputs the first PWM signal PWM1 with the high voltage logic level, so that the next first PWM signal PWM is triggered to be generated, and the second PWM signal PWM2 is accordingly generated. Now, the frequency detecting unit 304 notifies the reduction control unit 302 to control the adjustment module 102 to reduce the pulse width of the second PWM signal PWM2.

Figure 5:
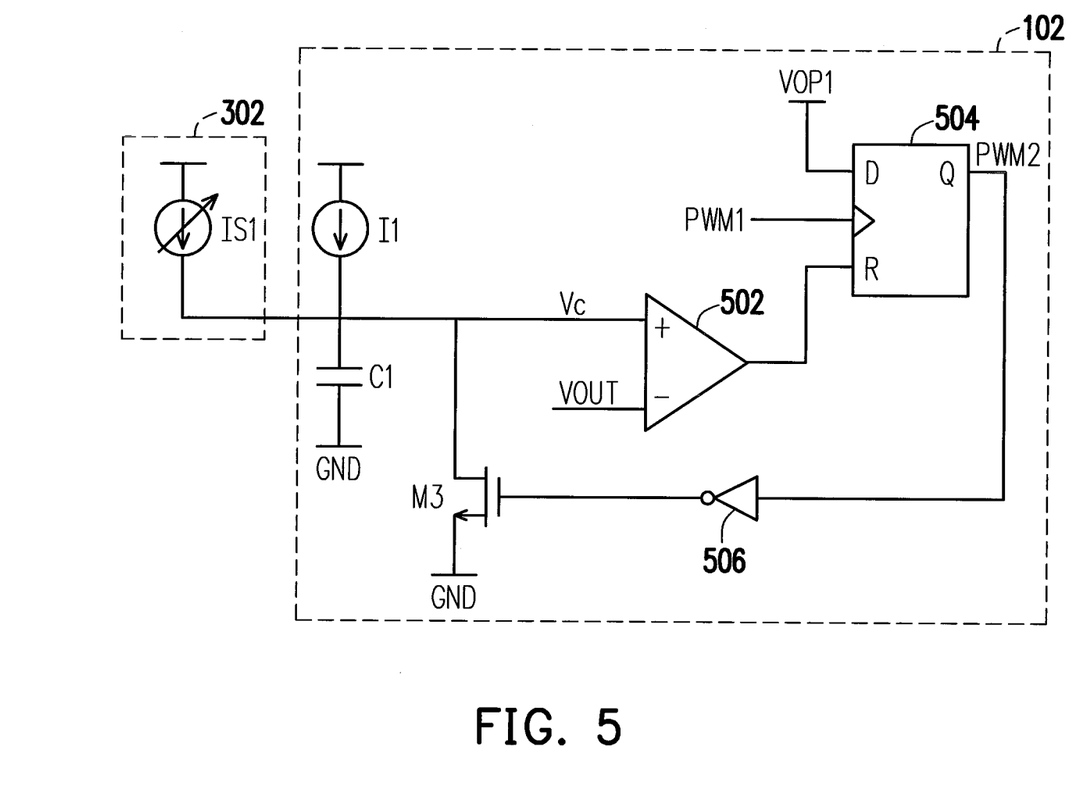
FIG. 5 and FIG. 6 are schematic diagrams of an adjustment module and a reduction control unit according to another embodiment of the invention.

In detail, implementations of the adjustment module 102 and the reduction control unit 302 are as that shown in FIG. 5. The adjustment module 102 includes a first comparator 502, a first current source I1, a first capacitor C1, a D-type flip-flop 504, a third transistor M3 and an inverter 506. Moreover, the reduction control unit 302 includes an adjustable current source IS1. The first current source I1 and the adjustable current source IS1 are coupled to a positive input terminal of the first comparator 502. The first capacitor C1 is coupled between the positive input terminal of the first comparator 502 and the ground GND. A drain and a source of the third transistor M3 are respectively coupled to the positive input terminal of the first comparator 502 and the ground GND. A data input terminal D of the D-type flip-flop 504 is coupled to a first operating voltage VOP, a clock input terminal of the D-type flip-flop 504 is coupled to the first PWM signal PWM1, a reset terminal R of the D-type flip-flop 504 is coupled to an output terminal of the first comparator 502, and a data output terminal Q of the D-type flip-flop 504 is coupled to the driving unit 306. Moreover, the inverter 506 is coupled between the data output terminal Q of the D-type flip-flop 504 and a gate of the third transistor M3.

According to FIG. 5, it is known that the pulse width of the second PWM signal PWM2 is determined by the first PWM signal PWM1 and an output of the first comparator 502. The D-type flip-flop 504 outputs a signal from the data input terminal D to the data output terminal Q according to the first PWM signal PWM1 to generate the second PWM signal PWM2, and the output of the first comparator 502 can be used to reset the D-type flip-flop 504 to change the pulse width of the second PWM signal PWM2. In the present embodiment, a voltage of the positive input terminal of the first comparator 502 is a voltage Vc on the first capacitor C1, and variation of the voltage Vc on the first capacitor C1 is determined by the first current source I1 and the adjustable current source IS1. When the rising edge of the second PWM signal PWM2 is delayed, the adjustable current source IS1 charges the first capacitor C1 according to a transition delay time of the rising edge of the second PWM signal PWM2. A speed of voltage increase of the voltage Vc can be controlled by adjusting an output current of the adjustable current source IS1, so as to control the pulse width of the second PWM signal PWM2 (i.e. a conducting time of the second PWM signal PWM2).

For example, when the pulse width of the second PWM signal PWM2 is to be reduced, the output current of the adjustable current source IS1 is increased, so that the voltage Vc can quickly reach a value higher than the output voltage Vout, and the D-type flip-flop 504 is reset to transit the second PWM signal PWM2 to the low voltage logic level. The greater the output current of the adjustable current source IS1 is, the faster the voltage Vc reaches the value higher than the output voltage Vout, and the narrower the pulse width of the second PWM signal PWM2 is.

It should be noticed that the reduction control unit 302 is, for example, a digital control circuit, and a current magnitude of the adjustable current source IS1 is, for example, controlled by a least significant bit (LSB). When the frequency of the second PWM signal PWM2 is adjusted to be higher than the predetermined frequency, the digital signal controlling the adjustable current source IS1 is fixed, so that the second PWM signal PWM2 output by the second adjustment module 102 is maintained to the adjusted pulse width.

Figure 6:
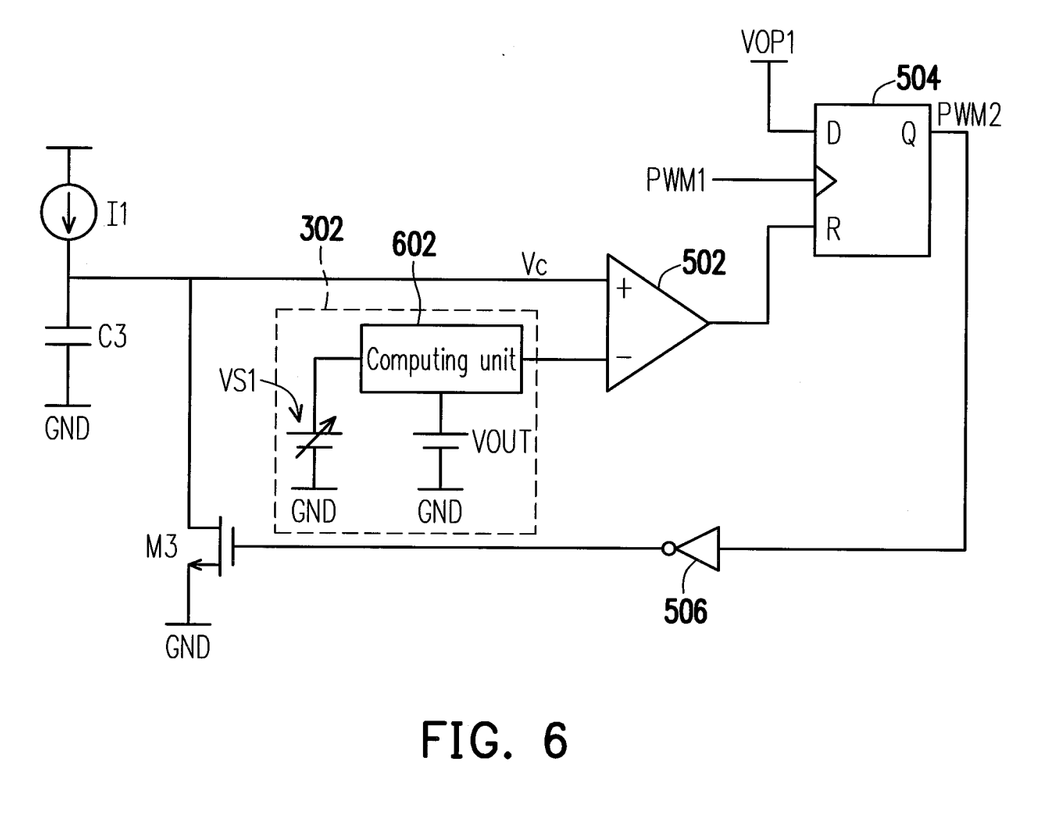

FIG. 6 is a schematic diagram of an adjustment module and a reduction control unit according to another embodiment of the invention. Referring to FIG. 6, a difference between the present embodiment and the embodiment of FIG. 5 is that in the embodiment of FIG. 5, the pulse width of the second PWM signal PWM2 is adjusted through the current magnitude of the adjustable current source IS1, and in the present embodiment, an adjustable voltage source VS1 is used to adjust the pulse width of the second PWM signal PWM2. As shown in FIG. 6, the reduction control unit 302 includes a computing unit 602 and the adjustable voltage source VS1, where the computing unit 602 is coupled between the negative input terminal of the first comparator 502 and the output voltage Vout, and the adjustable voltage source VS1 is coupled between the computing unit 602 and the ground GND.

Similarly, when the rising edge of the second PWM signal PWM2 is delayed, the adjustable voltage source VS1 outputs a corresponding adjusting voltage according to the transition delay time of the rising edge of the second PWM signal PWM2, and the computing unit 602 subtracts the adjusting voltage from the output voltage, so as to control the pulse width of the second PWM signal PWM2.

For example, when the pulse width of the second PWM signal PWM2 is to be reduced, the adjusting voltage output by the adjustable voltage source VS1 is increased, so that the output voltage Vout can be quickly pulled down to a value lower than the voltage Vc, and the D-type flip-flop 504 is reset to transit the second PWM signal PWM2 to the low voltage logic level. The greater the adjusting voltage output by the adjustable voltage source VS1 is, the faster the output voltage Vout is pulled down to the value lower than the voltage Vc, and the narrower the pulse width of the second PWM signal PWM2 is.

Similarly, a magnitude of the adjusting voltage output by the adjustable voltage source VS1 is also, for example, controlled by the LSB. When the frequency of the second PWM signal PWM2 is adjusted to be higher than the predetermined frequency, the digital signal controlling the adjustable voltage source VS1 is fixed, so that the second PWM signal PWM2 output by the second adjustment module 102 is maintained to the adjusted pulse width.

Figure 7:
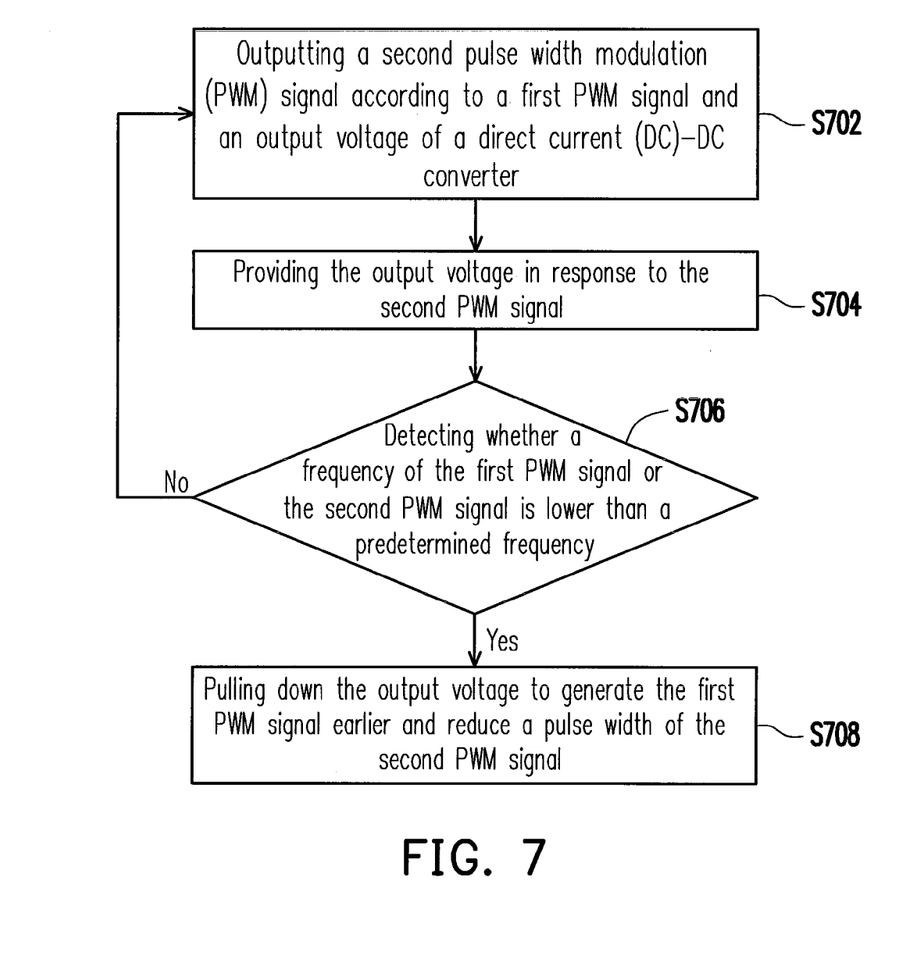
FIG. 7 is a flowchart illustrating a voltage conversion method of a DC-DC converter according to an embodiment of the invention.

FIG. 7 is a flowchart illustrating a voltage conversion method of a DC-DC converter according to an embodiment of the invention. Referring to FIG. 7, steps of the voltage conversion method of the DC-DC converter are described as follows. First, a second PWM signal is output according to a first PWM signal and an output voltage of the DC-DC converter (step S702). Then, the output voltage is provided in response to the second PWM signal (step S704). Then, it is detected whether a frequency of the first PWM signal or the second PWM signal is lower than a predetermined frequency (step S706). When the frequency of the first PWM signal or the second PWM signal is lower than the predetermined frequency, the output voltage is pulled down, so as to generate the first PWM signal earlier, and reduce a pulse width of the second PWM signal (step S708). Comparatively, when the frequency of the PWM signal is higher than the predetermined frequency, the pulse width of the PWM signal is not adjusted, and the step S702 is returned, and the second PWM signal is output according to the first PWM signal and the output voltage of the DC-DC converter.

In summary, when a load of the DC-DC converter is too light, the DC-DC converter can raise the frequency of its PWM signal, and reduce the pulse width of the PWM signal according to the frequency of the PWM signal, so as to avoid the frequency of the PWM signal falling into a frequency range that can heard by human's ear and maintain a high conversion efficiency of the DC-DC converter.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A direct current (DC)-DC converter, comprising:
    an adjustment module, outputting a second pulse width modulation (PWM) signal according to a first PWM signal and an output voltage of the DC-DC converter;
    an output module, coupled to the adjustment module, and providing the output voltage in response to the second PWM signal; and
    a control module, coupled to the adjustment module and the output module, for detecting a frequency of the first PWM signal or the second PWM signal,
    wherein when the frequency of the first PWM signal or the second PWM signal is lower than a predetermined frequency, the control module outputs a control signal to control the output module to pull down the output voltage, so that the first PWM signal is generated earlier, and controls the adjustment module to reduce a pulse width of the second PWM signal.

2. The DC-DC converter as claimed in claim 1, wherein the output module comprises:
    an inductor, having a first end outputting the output voltage;
    a switching unit, coupled to a second end of the inductor, an input voltage and a ground; and
    a driving unit, coupled to the adjustment module, the control module and the switching unit, and controlling the switching unit to output the output voltage through the first end of the inductor.

3. The DC-DC converter as claimed in claim 2, wherein the switching unit comprises:
    a first transistor; and
    a second transistor, wherein the first transistor and the second transistor are connected in series between the input voltage and the ground, gates of the first transistor and the second transistor are coupled to the driving unit, a common node of the first transistor and the second transistor is coupled to the second end of the inductor, and conducting states of the first transistor and the second transistor are controlled by the driving unit,
    wherein the driving unit forcibly turns on the second transistor according to a priority mechanism and the control signal until a next first PWM signal is generated earlier.

4. The DC-DC converter as claimed in claim 3, wherein when the frequency of the second PWM signal is lower than the predetermined frequency, the driving unit turns on the second transistor.

5. The DC-DC converter as claimed in claim 3, further comprising:
a current detecting unit, coupled to the driving unit, for detecting a current of the inductor, wherein when the current of the inductor drops to zero, the driving unit turns off the second transistor, and when the frequency of the second PWM signal is lower than the predetermined frequency, and the current of the inductor drops to zero, the driving unit forcibly turns on the second transistor according to the priority mechanism.

6. The DC-DC converter as claimed in claim 3, wherein the control module comprises:
a frequency detecting unit, detecting a transition time point of a rising edge of the first PWM signal or the second PWM signal in each signal period, wherein when the rising edge of the first PWM signal or the second PWM signal is delayed, the frequency detecting unit outputs the control signal to control the driving unit to turn on the second transistor, so as to trigger the next first PWM signal to be generated earlier; and
a reduction control unit, coupled to the frequency detecting unit and the adjustment module, and controlling the adjustment module to reduce the pulse width of the second PWM signal.

7. The DC-DC converter as claimed in claim 6, wherein the adjustment module comprises:
a first comparator, having a negative input terminal coupled to the output voltage;
a first current source, coupled to a positive input terminal of the first comparator, wherein a current generated by the first current source is proportional to the input voltage;
a first capacitor, coupled between the positive input terminal of the first comparator and the ground;
a D-type flip-flop, having a data input terminal coupled to a first operating voltage, a clock input terminal coupled to the first PWM signal, a reset terminal coupled to an output terminal of the first comparator, and a data output terminal coupled to the driving unit;
a third transistor, having a drain and a source respectively coupled to the positive input terminal of the first comparator and the ground; and
an inverter, coupled between the data output terminal of the D-type flip-flop and a gate of the third transistor.

8. The DC-DC converter as claimed in claim 7, wherein the reduction control unit comprises:
an adjustable current source, coupled to the positive input terminal of the first comparator, wherein when the rising edge of the second PWM signal is delayed, the adjustable current source charges the first capacitor according to a transition delay time of the rising edge of the second PWM signal.

9. The DC-DC converter as claimed in claim 7, wherein the reduction control unit comprises:
a computing unit, coupled between the output voltage and the negative input terminal of the first comparator; and
an adjustable voltage source, coupled between the computing unit and the ground, wherein when the rising edge of the second PWM signal is delayed, the adjustable voltage source outputs an adjusting voltage according to a transition delay time of the rising edge of the second PWM signal, and the computing unit pulls down the output voltage by subtracting the adjusting voltage from the output voltage.

10. The DC-DC converter as claimed in claim 7, wherein the reduction control unit is a digital control circuit.

11. The DC-DC converter as claimed in claim 6, further comprising:
a feedback unit, coupled between an output terminal of the DC-DC converter and the ground; and
a PWM signal generating module, coupled to the adjustment module and the feedback unit, and generating the first PWM signal according to a reference voltage and a divided voltage of the output voltage.

12. The DC-DC converter as claimed in claim 11, wherein the PWM signal generating module comprises:
an error amplifier, having a positive input terminal and a negative input terminal respectively coupled to the reference voltage and a resistance unit, and generating an error signal according to the reference voltage and the divided voltage of the output voltage;
a compensation unit, coupled to an output terminal of the error amplifier, and compensating the error signal;
a ramp generator, generating a ramp signal; and
a second comparator, having a positive input terminal and a negative input terminal respectively coupled to the output terminal of the error amplifier and the ramp generator, and generating the first PWM signal according to a comparison result of the error signal and the ramp signal.

13. A voltage conversion method, adapted to a direct current (DC)-DC converter, the voltage conversion method comprising:
outputting a second PWM signal according to a first PWM signal and an output voltage of the DC-DC converter;
providing the output voltage in response to the second PWM signal; and
detecting whether a frequency of the first PWM signal or the second PWM signal is lower than a predetermined frequency,
wherein when the frequency of the first PWM signal or the second PWM signal is lower than the predetermined frequency, the output voltage is pulled down, so as to generate the first PWM signal earlier, and reduce a pulse width of the second PWM signal.

* * * * *